(12) United States Patent
Geibel

(10) Patent No.: US 8,226,834 B2
(45) Date of Patent: Jul. 24, 2012

(54) APPARATUS AND METHOD FOR DISTRIBUTING GAS AND LIQUID DURING BACKWASH IN FILTER UNDERDRAIN FLUMES USING DUAL SEPARATION

(75) Inventor: John L. Geibel, Butler, PA (US)

(73) Assignee: Xylem Water Solutions Zelienople, LLC, Zelienople, PA (US)

( * ) Notice: Subject to any disclaimer, the term of this patent is extended or adjusted under 35 U.S.C. 154(b) by 1001 days.

(21) Appl. No.: 11/914,620

(22) PCT Filed: May 17, 2006

(86) PCT No.: PCT/US2006/018965
§ 371 (c)(1),
(2), (4) Date: May 28, 2008

(87) PCT Pub. No.: WO2006/130341
PCT Pub. Date: Dec. 7, 2006

(65) Prior Publication Data
US 2008/0245750 A1   Oct. 9, 2008

Related U.S. Application Data

(60) Provisional application No. 60/681,592, filed on May 17, 2005.

(51) Int. Cl.
*B01D 24/46* (2006.01)
(52) U.S. Cl. ......... 210/794; 210/274; 210/275; 210/293
(58) Field of Classification Search .................. 210/794, 210/274, 275, 293
See application file for complete search history.

(56) References Cited

U.S. PATENT DOCUMENTS

| | | | |
|---|---|---|---|
| 801,810 | A | 10/1905 | Parmelee |
| 1,142,270 | A | 6/1915 | Reisert |
| 2,154,167 | A | 4/1939 | Jenks |
| 4,064,050 | A | 12/1977 | Heaney et al. |

(Continued)

FOREIGN PATENT DOCUMENTS

WO    9804332 A1    2/1998

*Primary Examiner* — Chester Barry
(74) *Attorney, Agent, or Firm* — The Webb Law Firm, PC

(57) ABSTRACT

A backwash distribution apparatus for a filter having a filter tank and a plurality of underdrain laterals includes a first and second separator device positioned in a common main conduit to define first and second auxiliary flumes. The first and second auxiliary flumes are in fluid communication with the common main conduit and the underdrain laterals. The first separator device has at least one flume liquid metering orifice preferably located near the bottom of the first separator device so that it may be below a gas liquid interface in the first auxiliary flume. The second separator device has either a weir edge or a plurality of metering orifices (or both) for passing backwash liquid from the common main conduit into the second auxiliary flume. The second separator device creates an adequate liquid pool in the common main conduit to prevent short circuiting of gas into a liquid opening for the common main conduit and also to provide low velocity flow of backwash liquid therein, while also providing uninhibited flow of backwash gas. The second separator also controls the distribution of backwash liquid and/or gas inside the common main conduit. A method for gas backwash in the presence of liquid according to the invention is also disclosed.

26 Claims, 4 Drawing Sheets

U.S. PATENT DOCUMENTS

| | | |
|---|---|---|
| 4,065,391 A | 12/1977 | Farabaugh |
| 4,196,079 A | 4/1980 | Ward |
| 4,338,202 A | 7/1982 | Louboutin |
| 4,435,286 A | 3/1984 | Louboutin et al. |
| 4,604,197 A | 8/1986 | Louboutin et al. |
| 4,627,923 A | 12/1986 | Ross |
| 4,995,990 A | 2/1991 | Weston |
| 5,068,034 A | 11/1991 | Walter |
| 5,087,362 A | 2/1992 | Brown |
| 5,089,147 A | 2/1992 | Ross |
| 5,137,645 A | 8/1992 | Miller |
| 5,156,738 A | 10/1992 | Maxson |
| 5,160,614 A | 11/1992 | Brown |
| 5,232,592 A | 8/1993 | Brown et al. |
| 5,296,138 A * | 3/1994 | Walter ............ 210/274 |
| 5,328,608 A | 7/1994 | Bergmann et al. |
| 5,362,384 A | 11/1994 | Whetsel |
| 5,401,405 A | 3/1995 | McDougald |
| 5,413,710 A | 5/1995 | Roberts et al. |
| 5,462,664 A | 10/1995 | Neuspiel |
| 5,512,174 A | 4/1996 | Capon |
| 5,639,384 A | 6/1997 | Brown et al. |
| 6,306,310 B1 * | 10/2001 | Bergmann et al. ............ 210/794 |
| 6,312,611 B1 * | 11/2001 | Bergman et al. ............ 210/793 |

* cited by examiner

APPARATUS AND METHOD FOR DISTRIBUTING GAS AND LIQUID DURING BACKWASH IN FILTER UNDERDRAIN FLUMES USING DUAL SEPARATION

CROSS REFERENCE TO RELATED APPLICATION

This application claims the benefit of U.S. Provisional Patent Application Ser. No. 60/681,592, filed May 17, 2005.

BACKGROUND OF THE INVENTION

1. Field of the Invention

This invention relates to apparatus for distributing gas and liquid, separately and concurrently, from a common main conduit to filter underdrains for backwash of filter media.

2. Description of Related Art

In a typical gravity filter for filtering water and wastewater, one or more filter tanks are arranged in adjacent or opposing batteries. Filter underdrain laterals are laid on the floor of the filter tank one next to the other in parallel rows to define gas and liquid flow conduits below a bed of filtering media. The conduits make possible the collection of filtered liquid during filtration and the distribution of gas and liquid for backwash. A common main conduit (known as a "flume") is located immediately next to the filter tank to collect the filtered liquid from the underdrain laterals during filtration and to distribute gas and/or liquid to the underdrain laterals during gas (typically air) or liquid (typically water) backwash. The common main conduit also distributes gas and liquid separately and/or simultaneously to each of the underdrain laterals during backwash. In some installations, the common main conduit has its floor located somewhat lower than the elevation of the filter floor or even on the same elevation as the filter floor. Consulting engineers and contractors prefer these arrangements, because they are easier and cheaper to install. In retrofitting old filters with new underdrains, it is preferable to maintain the existing flume structure to reduce costs.

U.S. Pat. Nos. 6,306,310 and 6,312,611, both to Bergmann et al. and both entitled "Apparatus for Distributing Gas and Liquid During Concurrent Gas/Liquid Backwash in Filter Underdrain Flumes" are hereby incorporated by reference in their entirety. Each of these patents is directed to providing more room in filter systems having flumes by raising the interface of gas and liquid during backwash, while at the same time providing clear passages inside the common main conduit for gas flow to the underdrain laterals.

However, in some installations, it has been found desirable to prevent or limit air from entering the backwash liquid opening into the main filter flume during concurrent gas/liquid backwash. It has also been found desirable to limit the displacement of water from the filter flume into the filter tank during concurrent air and water backwash, so that the rise of water inside the filter tank is kept under control. It has also been found desirable to further control the velocity of liquid in the primary flume to ensure uniform liquid backwash distribution.

The present invention is directed to these and other objects as will be apparent from the description below.

SUMMARY OF THE INVENTION

The invention provides a backwash distribution apparatus having a filter with a filter tank. A flume is positioned adjacent to the filter tank and in communication with the filter tank. The flume has an opening for backwash liquid. A first separator device is positioned in the flume so as to define a first auxiliary flume between the first separator device and the filter tank. The first auxiliary flume is in fluid communication with the flume and the filter tank. The first separator device has at least one flume liquid metering orifice located in the first separator device. The flume liquid metering orifice is positioned to convey liquid into the first auxiliary flume during a concurrent gas/liquid backwash operation in the filter.

A second separator device is positioned in the flume and spaced from the first separator device to define a second auxiliary flume. The second separator device extends above the opening for backwash liquid. During concurrent gas/liquid backwash, liquid flows from the flume over or through the second separator device into the second auxiliary flume. The liquid then flows through the at least one liquid metering orifice into the first auxiliary flume. From there, the liquid flows into the filter tank.

The liquid may enter the second auxiliary flume by passing over a top edge of the second separator device. Alternatively, the liquid may flow through at least one liquid metering orifice in the second separator device into the second auxiliary flume. This liquid metering orifice is preferably located in an upper region of the second separator device. As will be apparent to those skilled in the art, the filter tank may include a plurality of underdrain laterals positioned in the filter tank, with a filter media bed positioned above the underdrain laterals. The underdrain laterals may be in the form of underdrain blocks or other suitable underdrain lateral arrangements. The invention also applies where liquid is simply present in the main flume, but not flowing (e.g., during gas only backwash). The underdrain may be a false floor and nozzle arrangement, or any other underdrain arrangement adapted for gas and liquid backwash.

The first separator device may comprise a baffle, e.g., of stainless steel, which extends to a height that is less than the height of the flume to define a clearance above the baffle. Likewise, the second separator device may also comprise a stainless steel baffle extending to a height which is less than the height of the flume. Alternatively, the second separator device may extend the full height of the flume thereby providing no clearance above the second separator device. The first and second separator devices are separated an appropriate distance, e.g., 3-8 inches, thereby defining the second auxiliary flume therebetween. As a further alternative, the first separator device may extend to a height which is greater than the height of the second separator device, to prevent spillover.

The filter includes a filter tank wall separating the first auxiliary flume and the filter tank. The filter tank wall has at least one opening therein for fluidly connecting the first auxiliary flume with the filter tank. This opening may be known as a "wall sleeve."

The flume liquid metering orifice in the first separator device is preferably located in a lower region of the first separator device. The second separator device may include two rows of metering orifices in an upper portion thereof. An upper row would comprise gas and/or liquid metering orifices and a lower row comprising liquid metering orifices. Furthermore, the second separator device may contain a plurality of drainage holes near a lower edge thereof.

A still further alternative for the second separator device would be to include a plurality of tapered metering orifices along the length thereof. The tapered orifices would typically be positioned in an upper region of the second separator device and they would decrease in size along the length of the second separator device.

The invention also includes a method of introducing a backwash gas in the presence of a backwash liquid to a filter having a filter tank. The method comprises the steps of introducing backwash gas in the presence of backwash liquid into an enclosed flume. A first gas/liquid interface is established in the enclosed flume above an opening for introducing backwash liquid to the flume, and a second gas/liquid interface is established in the enclosed flume. A third gas/liquid interface is established in the enclosed flume, with the third gas/liquid interface being positioned below the first gas/liquid interface. The second gas/liquid interface is located spatially between the first and third interfaces.

Backwash liquid may then be passed into the filter tank from beneath the second gas/liquid interface. Backwash gas is passed through an opening which is above the third gas/liquid interface, from the enclosed flume into the filter tank separately or simultaneously with the backwash liquid. Furthermore, the second gas/liquid interface may be positioned below or at the same height as the first gas/liquid interface, with the third gas/liquid interface positioned below the second gas/liquid interface.

DETAILED DESCRIPTION OF THE PREFERRED EMBODIMENTS

Figure 1:
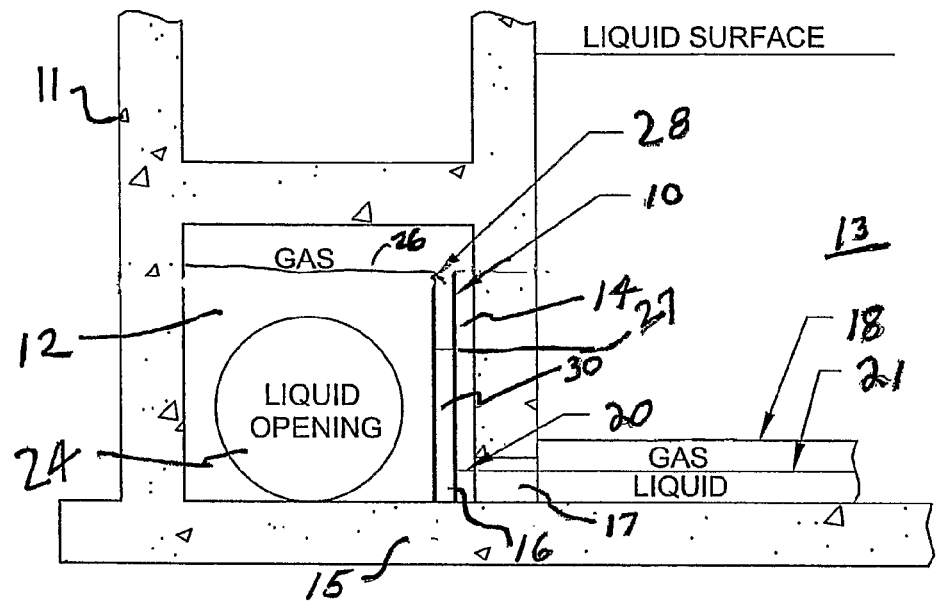
FIG. 1 is an elevation view of a flume and filter tank during concurrent gas/liquid backwash, according a first embodiment of the present invention.

Referring to FIG. 1, the invention includes a first separator device 10, which may be a baffle, positioned inside a common main conduit (a.k.a., flume, gullet, channel, manifold or chamber) 12 to create a first auxiliary flume 14 within the main conduit. The main conduit 12 is formed in a filter 11 and is positioned next to a filter box 13. Main conduit 12 is enclosed, i.e., it is not opened to the atmosphere. Main conduit 12 and filter tank 13 share a common filter floor 15, so that the floors of main conduit 12 and filter tank 13 are at the same elevation. Alternatively, although not shown, the bottom or floor of main conduit 12 may be somewhat lower than the elevation of the floor for the filter tank 13. This latter arrangement is known as a "recessed flume" arrangement. Another alternative (although not common) is that the filter floor may be below the flume floor.

Figure 2:
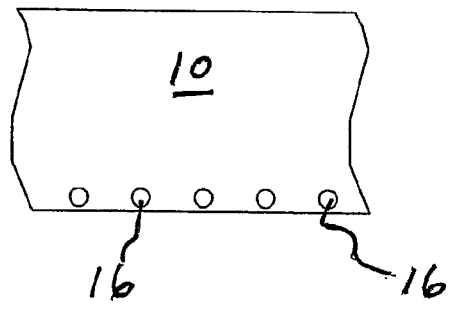
FIG. 2 is an elevation view, broken away showing a typical first separator device according to the present invention.

Flume liquid metering orifices 16 (see FIG. 2) are preferably located in a lower part of the first separator device 10 for flow of liquid from the main conduit 12 to the auxiliary flume 14 during concurrent gas/liquid backwash. The auxiliary flume 14 serves as a passage for the gas and liquid during concurrent gas/liquid backwash. Generally, liquid will flow through auxiliary flume 14 and then through wall sleeve 17 into underdrains 18. Likewise, gas will flow through the wall sleeves and into the underdrains 18. As mentioned above, liquid is introduced during concurrent backwash to the auxiliary flume 14 through liquid metering orifices 16.

During concurrent gas/liquid backwash, an interface 20 is formed in first auxiliary flume 14. This may or may not be at the same exact level as the interface 21 formed within underdrains 18.

Liquid opening 24 introduces backwash liquid into main conduit 12. It is important that interface 26 in main conduit 12 not drop below the level of opening 24. Otherwise, gas will be directed back into the liquid piping system, with negative effects. To that end, a second separator device 28, according to the invention, is installed in main conduit 12. The second separator device 28 may also take the form of a baffle, similar to first separator device 10. Second separator device 28 is spaced an appropriate distance from first separator device 10, e.g., 3-8 inches. In the intervening space, a second auxiliary flume 30 is defined. Among other functions, the second separator device 28 ensures that interface 26 is maintained at a level above the liquid opening 24, to prevent short circuiting of gas into the liquid piping system. Second separator device 28 may be at the same height as, extending above or extending below first separator device 10, as described in more detail below. Second separator device 28 is normally higher than liquid opening 24, to prevent short circuiting.

As shown in FIG. 1, second separator device 28 will prevent the displacement of most of the liquid in main conduit 12 into filter tank 13. This may be important in particular filter designs when the vertical distance for the liquid rise inside filter tank 13 has to be reserved for a rise in liquid level with combined gas and liquid filter backwash. Furthermore, second separator device 28 maintains maximum water level within main conduit 12, therefore providing maximum cross-sectional area of the water flow, and this keeps the velocity of the water in main conduit 12 to an acceptable minimum. The velocity of the water in main conduit 12, during concurrent gas/liquid backwash, would generally be within the range of 0.5-1 ft. per second (at normal backwash rates). During liquid only backwash, the velocity of liquid within main conduit 12 should be within the range of 2-3 ft. per second (at normal backwash rates).

Figure 3:
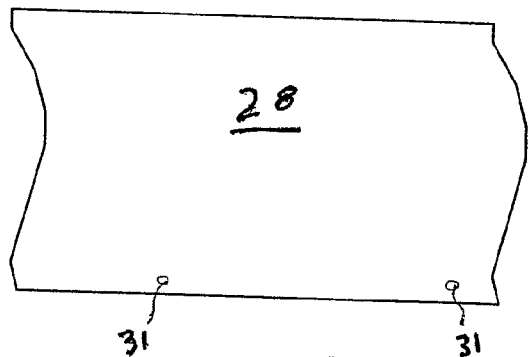
FIG. 3 is an elevation view, broken away, showing a typical second separator device according to the present invention.

Second separator device 28 may be made of stainless steel or other suitable material, and its spacing from first separator device 10 should be far enough so that liquid entering second auxiliary flume 30 from main conduit 12 does not overshoot second separator device 28 and first separator device 10. Referring to FIG. 3, second separator device 28 may optionally include drain holes at the bottom of second separator device 28, e.g., ½ in. orifices on 1 ft. centers, to prevent pooling of water inside second auxiliary flume 30.

Figure 4:
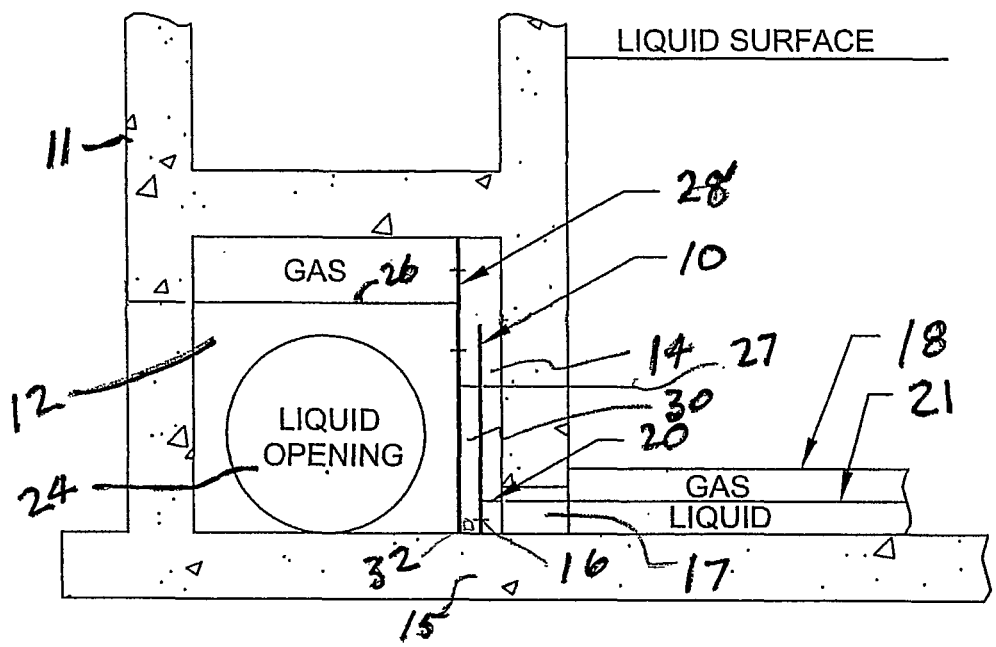
FIG. 4 is an elevation view of a flume and filter tank according to the second embodiment of the invention, during concurrent gas/liquid backwash.

Referring to FIG. 4, a second embodiment of the invention is shown. Second separator device 28' extends the full height of main conduit 12 and contains two rows of metering holes. Particularly, upper metering orifices 34, during concurrent gas/liquid backwash, will meter gas (perhaps along with some liquid) from main conduit 12 into auxiliary flume 14. Lower metering orifices 36 will meter liquid from main conduit 12 into second auxiliary flume 30. As in the first embodiment, it is important that liquid entering second auxiliary flume 30 not overshoot first separator device 10, so that the gas/liquid interface 20 in first auxiliary flume 14 is not disturbed.

A drain opening 32 may be positioned in a front wall of the main conduit 12, between first and second separator devices 10, 28', for the purpose of draining liquid from the second auxiliary flume 30.

Figure 5:
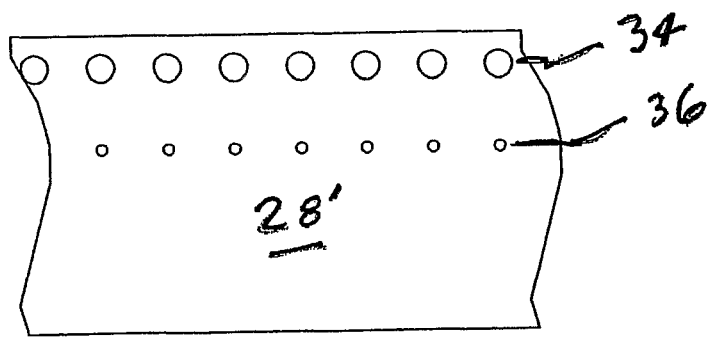
FIG. 5 is an elevation view, broken away, of a second separator device according to a second embodiment of the invention.

Referring to FIG. 5, upper metering orifices 34 are shown in circular form. However, any shape may be acceptable, as long as they have the appropriate cross-sectional area and spacing. The size and spacing of upper orifices 34 will depend on the hydraulics of the particular system, as will be determined by one skilled in the art. Lower metering orifices 36 allow liquid to pass therethrough at low backwash rates. Lower metering orifices 36 generally have a smaller cross-sectional opening than upper metering orifices 34.

Figure 6:
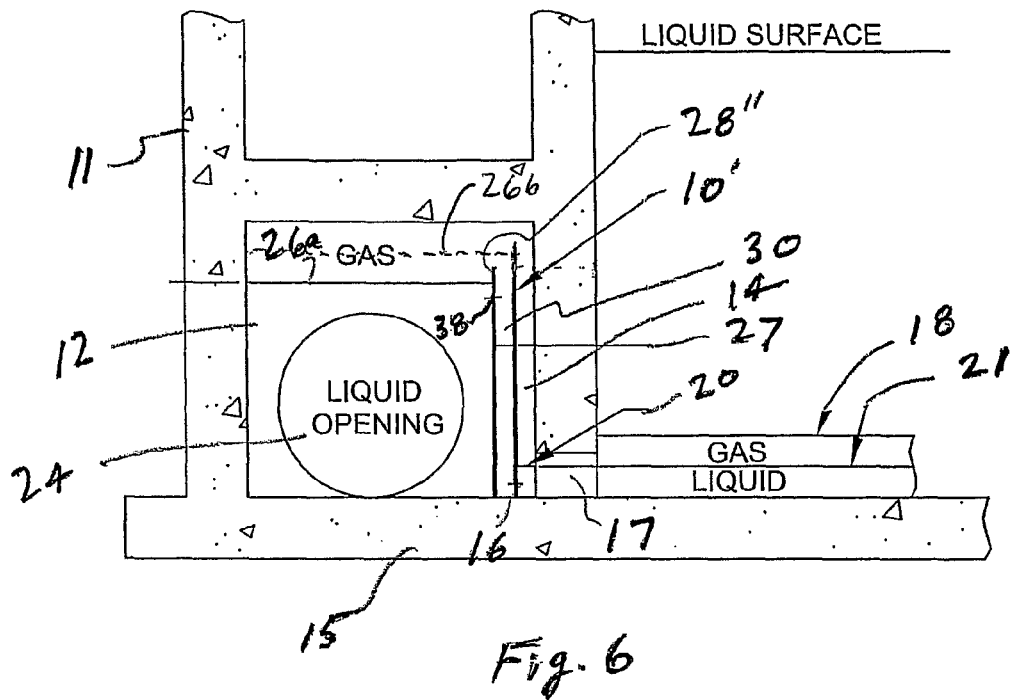
FIG. 6 is an elevation view of a flume and filter tank according to a third embodiment of the invention, during concurrent gas/liquid backwash.
Figure 7:
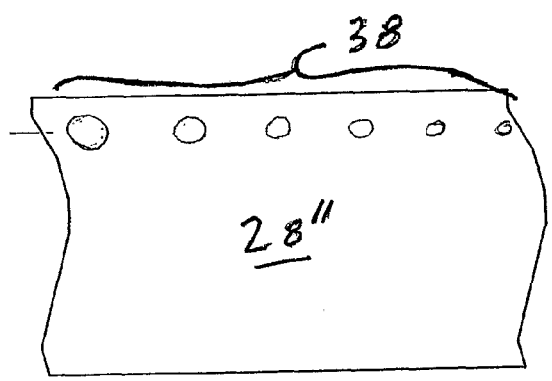
FIG. 7 is an elevation view, broken away, showing an alternate second separator device according to the invention.

Referring to FIG. 6, a third embodiment of the invention is shown. Second separator device 28" extends to a height which is lower than the upper edge of first separator device 10'. This avoids liquid overshooting the second separator device 28' and entering first auxiliary flume 14. Gas/liquid interface 26a or 26b may be established in main conduit 12. Both first separator device 10' and second separator device 28' extend to a height which is less than the full height of main conduit 12 so that there is clearance above the top edge of each separator device 10', 28'. This permits flow of gas in an uninhibited fashion from the main conduit 12 into the first auxiliary flume 14 and eventually into the underdrain 18. Metering orifices 38 may be tapered as shown in FIG. 7, so that the cross-sectional openings of the orifices 38 will decrease along the length of second separator device 28'. This provides for equal distribution of liquid during high-rate liquid backwash. The sizing and spacing of tapered orifices 38 will depend on the hydraulics of the particular filter in which they are used, as will be apparent to those skilled in the art. It is envisioned that this arrangement (FIG. 7) will be particularly useful in connection with the separator device 28 of FIG. 4.

Generally, the dual separation arrangement according to the first through third embodiments of the invention described above will permit engineers and contractors to minimize the size of the main conduit 12 (in new construction) and will also permit effective retrofitting of existing flumes having small cross-sections, while at the same time ensuring proper hydraulics and even distribution of backwash liquids and gases. By "dual separation" it is meant to say that the backwash liquid is separated twice from the main conduit 12, prior to passing through wall sleeve 17 and entering the underdrain 18. As is well-known to those skilled in the art, a filter media bed (not shown) is positioned above the underdrain 18 and generally beneath the liquid surface noted on FIGS. 1, 4 and 6. This bed is regularly backwashed to clean and dislodge dirt particles on the filter media, ensuring proper operation of the filter.

In operation, backwash liquid, commonly water, is introduced through liquid opening 24 to main conduit 12. At times, water alone will be introduced to main conduit 12, for high-rate water only backwash. Also, gas alone may be introduced. However, it is commonly required to introduce backwash water and backwash gas, commonly air, in a concurrent fashion, to enhance the scouring action of the filter media bed. In that case, gas is introduced concurrently into main conduit 12 by various means well-known to those skilled in the art. With both fluids in the main conduit 12 at the same time (either during concurrent or gas only backwash), gas/liquid interface 26 is formed in main conduit 12. Importantly, according to the invention, gas/liquid interface 26 is maintained for the most part above liquid opening 26, so that substantial gas does not enter liquid opening 26. According to the embodiment in FIG. 1, backwash liquid flows over a top edge of second separator device 28 and into second auxiliary flume 30. Another gas/liquid interface 27 is thereby formed in second auxiliary flume 30. Gas/liquid interface 27 may or may not be located below the level of gas/liquid interface 26.

Backwash liquid then flows through flume metering orifices 16 in first separator device 10 into first auxiliary flume 14. From there, the backwash liquid proceeds through wall sleeves 17 into underdrain 18. Backwash gas proceeds from main conduit 12 and into first auxiliary flume 14. A gas/liquid interface 20 is thereby formed in first auxiliary flume 14. Gas passes through the wall sleeve 17 into underdrain 18. Gas/liquid interface 20 is positioned below interface 26 and interface 27. Interface 27 is located spatially (i.e., looking from left to right in FIG. 1) between interfaces 26 and 20.

During high-rate water only backwash, main conduit 12, first auxiliary flume 14 and second auxiliary flume 30 are all completely filled with water.

Referring to FIG. 4, this embodiment of the invention operates similarly to that described in connection with FIG. 1. However, second separator device 28' extends the full height of main conduit 12 so that backwash gas (perhaps accompanied by some liquid) must pass through upper metering orifices 34 into first auxiliary flume 14. Backwash liquid is passing through lower metering orifices 36 into second auxiliary flume 30 and from there through metering orifices 16 into first auxiliary flume 14. The positions of the relative gas/liquid interfaces are the same as described in connection with FIG. 1.

Referring to FIG. 6, backwash liquid may be introduced into second auxiliary flume 30 either through tapered orifices 38 or by passing over the upper edge of second separator device 28" or both. Again, the gas/liquid interfaces during concurrent gas/liquid backwash will generally be the same as described in connection with FIG. 1, above.

Figure 8:
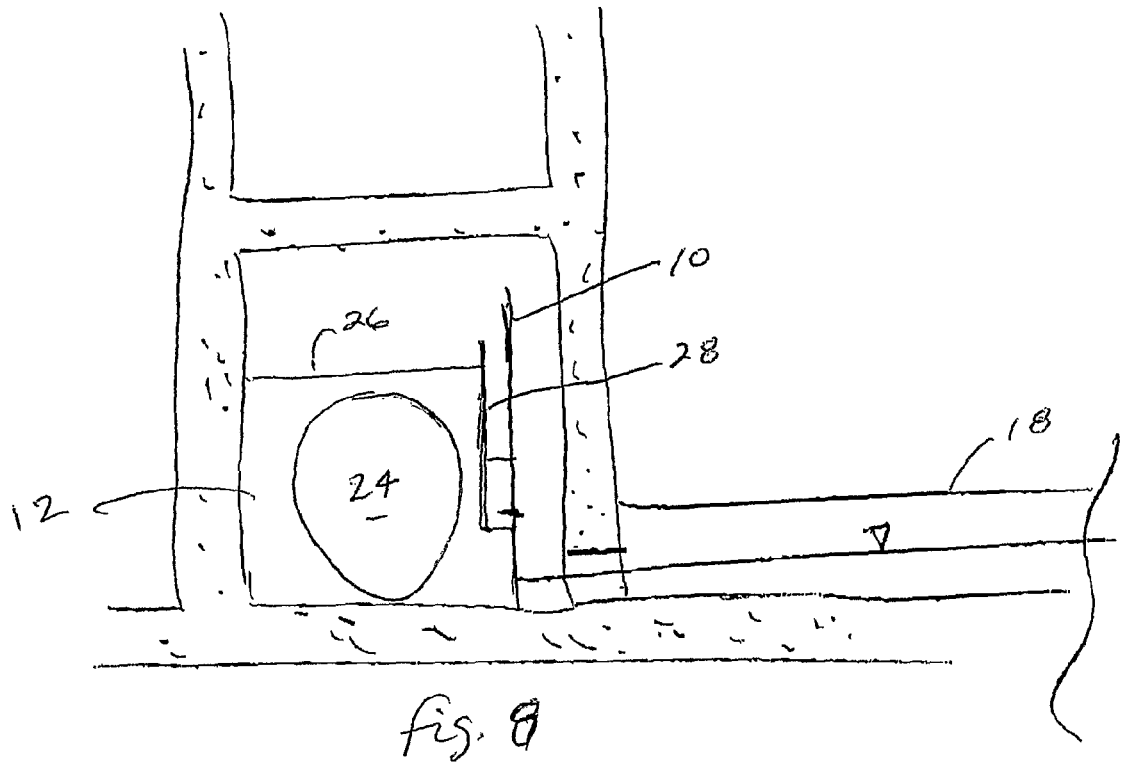
FIG. 8. is an elevation view showing a flume and filter tank according to a fourth embodiment of the invention, during concurrent gas/liquid backwash.
Figure 9:
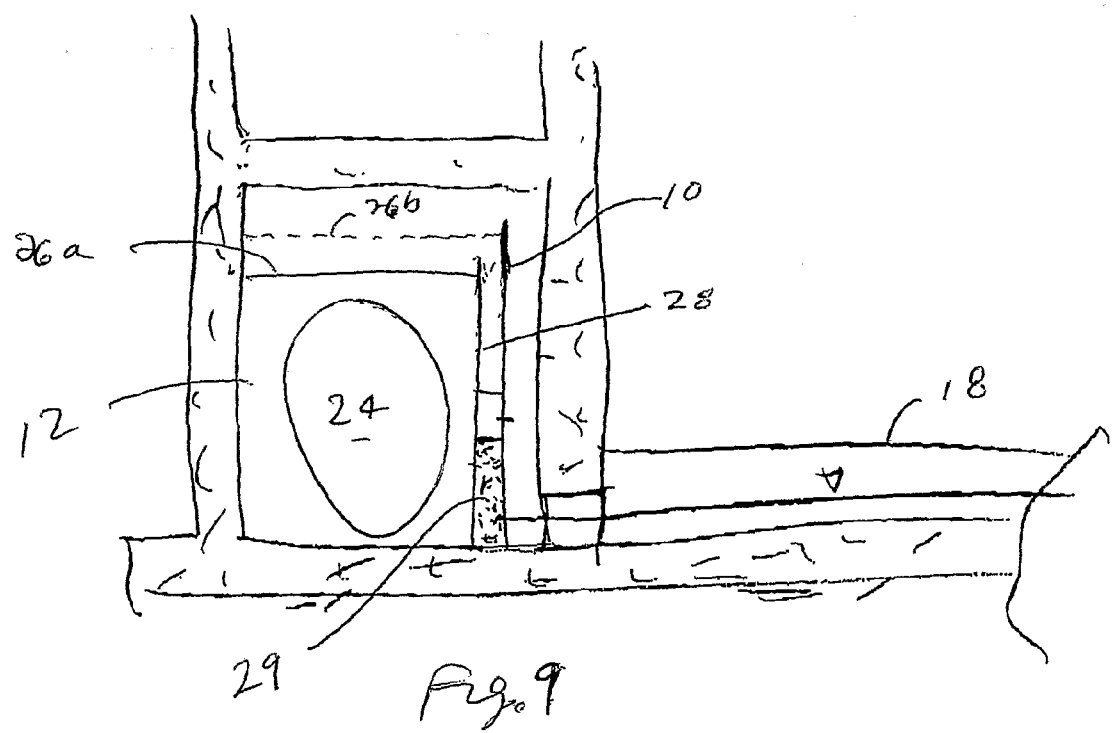
FIG. 9. is an elevation view of a flume and filter tank according to a fifth embodiment of the invention, during concurrent gas/liquid backwash.

FIGS. 8 and 9 show alternative arrangements according to fourth and fifth embodiments of the invention. Particularly, FIG. 8 shows the second separator device 28 offset from first separator device 10, in an L-shape. In FIG. 9, a concrete base 29 is positioned between first separator device 10 and second separator device 28. In this arrangement, second separator device 28 may or may not extend all the way to the floor of main conduit 12.

While the preferred embodiments of the invention have been described herein, it will be apparent to those skilled in the art that modifications and additions to the invention can be made, without departing from the scope and spirit thereof.

The invention claimed is:

1. A backwash distribution apparatus, comprising:
a filter having a filter tank;
a flume positioned adjacent the filter tank and in fluid communication with the filter tank and having a liquid opening for introducing backwash liquid into the flume;
a first separator device positioned in the flume so as to define a first auxiliary flume between the first separator device and the filter tank, the first auxiliary flume in fluid communication with the flume and the filter tank, the first separator device having at least one flume liquid metering orifice located in the first separator device, the flume liquid metering orifice positioned to convey liquid into the first auxiliary flume during a concurrent gas/liquid backwash operation in the filter; and
a second separator device positioned in the flume and spaced from the first separator device so as to define a second auxiliary flume between the first and second separator devices, both separator devices being located on the same side of the liquid opening, said second separator device extending to a height above said liquid opening;

wherein during backwashing with gas, when liquid is present in the flume, a gas/liquid interface in the flume is maintained above said liquid opening.

2. The apparatus of claim 1, wherein during concurrent gas/liquid backwash operation, said liquid flows over a top edge of said second separator device into said second auxiliary flume.

3. The apparatus of claim 1, wherein during concurrent gas/liquid backwash operation, liquid flows through at least one liquid metering orifice in said second separator device into said second auxiliary flume.

4. The apparatus of claim 3, wherein said liquid metering orifice in said second separator device is positioned in an upper region thereof.

5. The apparatus of claim 1, including a plurality of underdrain laterals positioned in the filter tank and a filter media bed positioned above the underdrain laterals.

6. The apparatus of claim 1, wherein the first separator device comprises a baffle which extends to a height which is less than a height of the flume to define a clearance above the baffle.

7. The apparatus of claim 1, wherein the second separator device comprises a baffle which extends to a height which is less than a height of the flume to define a clearance above the baffle.

8. The apparatus of claim 1, wherein said first and second separator device are separated a distance within a range of three to eight inches.

9. The apparatus of claim 1, including a filter tank wall separating the first auxiliary flume and the filter tank, the filter tank wall having at least one opening therein for fluidly connecting the first auxiliary flume with the filter tank.

10. The apparatus of claim 1, wherein said flume liquid metering orifice is located in a lower region of said first separator device.

11. The apparatus of claim 1, wherein said second separator device includes two rows of metering orifices in a upper portion thereof, an upper row comprising gas metering orifices and a lower row comprising liquid metering orifices.

12. The apparatus of claim 1, wherein said second separator device contains a plurality of drainage holes near a lower edge thereof.

13. The apparatus of claim 1, wherein said second separator device includes a plurality of liquid metering orifices in an upper region thereof; said liquid metering orifices decreasing in size along a length of said second separator device.

14. The apparatus of claim 1, wherein said second separator device extends the full height of said flume and contains a plurality of liquid metering orifices along with a plurality of gas metering orifices.

15. The apparatus of claim 1, wherein said first separator device extends to a height which is greater than the height of said second separator device.

16. The apparatus of claim 1, further including a drain outlet in fluid communication with said second auxiliary flume.

17. A method of introducing a backwash gas in the presence of a backwash liquid to a filter having a filter tank, the method comprising the steps of:
 a. introducing the backwash gas in the presence of the backwash liquid into an enclosed flume;
 b. establishing a first gas/liquid interface in the enclosed flume, said first gas/liquid interface being above a liquid opening into said enclosed flume;
 c. establishing a second gas/liquid interface in the enclosed flume;
 d. establishing a third gas/liquid interface, said third gas/liquid interface positioned below said first gas/liquid interface in the enclosed flume, said second gas/liquid interface being located between said first and third interfaces;
 e. passing backwash gas through an opening which is above said third gas/liquid interface, from the enclosed flume into the filter tank simultaneously with the backwash liquid.

18. The method of claim 17, wherein said second gas/liquid interface is established by passing backwash liquid through a metering orifice in a separator device, positioned in said flume.

19. The method of claim 17, wherein said third gas/liquid interface is established by passing backwash liquid through at least one metering orifice positioned below said second gas/liquid interface.

20. The method of claim 17, wherein said second gas/liquid interface is positioned at approximately the same height as said first gas/liquid interface.

21. The method of claim 17, wherein said second gas/liquid interface is established by flowing backwash liquid over a top edge of a separator device positioned in said flume, said separator device located between said first gas/liquid interface and said second gas/liquid interface.

22. The method of claim 21, including the further step of passing said backwash liquid through a subsequent separator device positioned in said flume, said subsequent separator device located between said second gas/liquid interface and said filter tank.

23. The method of claim 17, wherein said second gas/liquid interface is positioned below said first gas/liquid interface.

24. The method of claim 17, including the further step of passing backwash liquid, concurrently with the backwash gas into the filter tank from beneath the second gas/liquid interface.

25. The apparatus of claim 1, wherein a constant pressure is substantially maintained at the gas/liquid interface for any air and flow rate combination.

26. The method of claim 17, wherein a constant pressure is substantially maintained at the first, second, and third gas/liquid interface for any air and flow rate combination.

* * * * *